United States Patent
Yamamoto (10) Patent No.: US 7,422,294 B2
(45) Date of Patent: Sep. 9, 2008

(54) VEHICLE BRAKE SYSTEM AND VEHICLE CONTROL METHOD

(75) Inventor: Takayuki Yamamoto, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/559,091

(22) Filed: Nov. 13, 2006

(65) Prior Publication Data

US 2007/0132310 A1    Jun. 14, 2007

(30) Foreign Application Priority Data

Dec. 9, 2005    (JP)    .............................. 2005-355671

(51) Int. Cl.
*B60T 8/88* (2006.01)

(52) U.S. Cl. ................ 303/122.12; 303/11; 303/122.04

(58) Field of Classification Search ................... 303/10, 303/11, 122, 122.04, 122.05, 122.12, 191; 417/9, 13

See application file for complete search history.

(56) References Cited

U.S. PATENT DOCUMENTS

| | | | | |
|---|---|---|---|---|
| 5,558,414 A | * | 9/1996 | Kubota | 303/122.08 |
| 5,733,017 A | * | 3/1998 | Nakashima et al. | 303/10 |
| 5,779,327 A | * | 7/1998 | Nakashima et al. | 303/122.12 |
| 5,934,880 A | * | 8/1999 | Yamada et al. | 417/38 |
| 5,957,549 A | * | 9/1999 | Nagai et al. | 303/122.12 |
| 6,109,879 A | * | 8/2000 | Yamada et al. | 417/38 |
| 6,199,670 B1 | * | 3/2001 | Shirai et al. | 188/158 |
| 2005/0067893 A1 | * | 3/2005 | Kokubo | 303/115.4 |

FOREIGN PATENT DOCUMENTS

| | | |
|---|---|---|
| DE | 44 07 923 A1 | 11/1994 |
| DE | 197 51 334 A1 | 7/1998 |
| DE | 100 36 286 A1 | 2/2002 |
| DE | 102 15 392 A1 | 4/2003 |
| JP | 7-103201 | 4/1995 |
| JP | 2006-175960 | 7/2006 |

* cited by examiner

*Primary Examiner*—Robert A. Siconolfi
*Assistant Examiner*—Vu Q Nguyen
(74) *Attorney, Agent, or Firm*—Oblon, Spivak, McClelland, Maier & Neustadt, P.C.

(57) ABSTRACT

When an abnormality detection unit detects an abnormality in a vehicle brake system, a heat generation suppression unit operates the motor intermittently to suppress heat generation by the motor. A pressure increase determination unit determines whether there is a need to increase pressure to the wheel cylinders of the brake system. When there is a need to increase pressure to the wheel cylinders, the heat generation suppression unit operates the motor. When there is no need to increase pressure to the wheel cylinders, the heat generation suppression unit stops the motor.

6 Claims, 5 Drawing Sheets

VEHICLE BRAKE SYSTEM AND VEHICLE CONTROL METHOD

The disclosure of Japanese Patent Application No. 2005-355671 filed on Dec. 9, 2005 including the specification, drawings and abstract is incorporated herein by reference in its entirety.

BACKGROUND OF THE INVENTION

1. Field of the Invention

The invention relates to a vehicle brake system and a vehicle control method, and more particularly, to a technology for suppressing the generation of heat by a motor that drives a pump to accumulate a fluid under pressure in an accumulator.

2. Description of the Related Art

Generally, an electronically controlled brake (ECB) system generates braking force by feeding brake oil to wheel cylinders in accordance with a brake operation. High-pressure brake oil is constantly accumulated in an accumulator to ensure a good response. However, the pressure within the accumulator decreases every time a driver operates a brake pedal, so in order to maintain sufficient pressure in the accumulator, it is necessary to operate a pump to feed the brake oil to the accumulator. A hydraulic pressure supply device that controls the pump operation to maintain the accumulated hydraulic pressure in the accumulator in a range between lower and upper limit values to prevent excessive increases in the pump load is described, for example, in Japanese Patent Application Publication No. JP-A-07-103201.

The pressure control system disclosed in JP-A-07-103201 cannot control the motor appropriately if an accumulator pressure sensor malfunctions, creating a risk that the accumulator pressure cannot be maintained within the appropriate range. In many hydraulic pressure supply systems, this problem is handled by setting the discharge volume of the oil pump to match the highest possible rate of brake oil consumption. When a malfunction occurs, the motor is operated such that the pump discharges the pre-set volume of oil. However, this means that when the brake oil consumption rate is lower than the maximum, the load on the motor that drives the oil pump is unnecessarily high, which increases the amount of heat generated by the motor.

SUMMARY OF THE INVENTION

The invention provides a technology for decreasing the amount of heat generated by a motor that drives an oil pump for an accumulator when a brake system abnormality occurs.

A first aspect of the invention relates to a vehicle brake system that includes a pump driven by a motor, an accumulator to which a working fluid discharged from the pump is supplied so as to accumulate under pressure, and a wheel cylinder to which the working fluid supplied from the accumulator and that generates braking force on a wheel that is mounted on the vehicle. The vehicle brake system further includes abnormality detection device that detects an abnormality in the vehicle brake system, pressure increase determination device that determines whether there is a need to increase pressure to the wheel cylinder, and heat generation suppression device that operates the motor intermittently so as to suppress heat generation by the motor. The heat generation suppression device operates the motor when there is a need to increase pressure to the accumulator, and stops the motor when there is no need to increase pressure to the accumulator.

According to the first aspect of the invention, when an abnormality occurs in the vehicle brake system and the motor that drives the accumulator pump is operated intermittently, the motor is stopped when there is no need to increase pressure to the accumulator, irrespective of the intermittent operation cycle. The motor is not operated unless there is a need to increase pressure, even if the driver operates the brake pedal, so unnecessary heat generation by the motor can be prevented.

For example, the pressure increase determination device may determine that there is no need to increase pressure if the vehicle is stopped. Because there is little need to ensure the response of the braking force when the vehicle is stopped, the motor is stopped unless there is a need to increase pressure, even if the driver operates the brake pedal. Heat generation by the motor can therefore be suppressed.

The vehicle brake system further includes a master cylinder that supplies the working fluid at a pressure in accordance with an operation amount of a brake pedal. The pressure increase determination device may determine that there is a need to increase pressure if a state quantity of the master cylinder is equal to or larger than a prescribed threshold value. The state quantity of the master cylinder may be a master cylinder pressure or a brake pedal stroke, for example. If the pressure increase determination device determines that there is a need to increase pressure to the accumulator based on the state quantity, the motor is operated accordingly. Determining the need to increase pressure to the accumulator in this manner prevents the master cylinder from bottoming out when, for example, the accumulator pressure drops so much that the accumulator is rendered ineffective.

The vehicle brake system further includes a fluid passage that connects the accumulator with the wheel cylinder, as well as a pressure-increasing valve disposed in the fluid passage that controls supply of the working fluid to the wheel cylinder. The pressure increase determination device may determine that there is no need to increase pressure when the pressure-increasing valve is open, and a control current applied thereto has dropped to approximately a level at a time which the pressure-increasing valve is closed. The motor can therefore stop at an earlier stage, further suppressing the amount of heat generated.

The heat generation suppression device may operate the motor such that the pressure of the working fluid accumulated in the accumulator is maintained within a predetermined control range.

A second aspect of the invention relates to a control method of a vehicle brake system in which an accumulator that accumulates, under pressure, a working fluid discharged from a pump driven by a motor and supplies the working fluid to a wheel cylinder so as to generate braking force on a wheel of a vehicle. The control method includes the steps of detecting an abnormality in the vehicle brake system, and operating the motor when there is a need to increase pressure to the accumulator, and stopping the motor when there is no need to increase pressure to the accumulator, after the motor is operated intermittently when the abnormality is detected, so as to suppress heat generation by the motor.

In the second aspect of the invention, even if the motor that drives the accumulator pump is intermittently operated due to the abnormality in the vehicle brake system, the motor is stopped when there is no need to increase pressure to the accumulator. This makes it possible to suppress heat generation by the motor.

BRIEF DESCRIPTION OF THE DRAWINGS

The foregoing and further objects, features and advantages of the invention will be become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
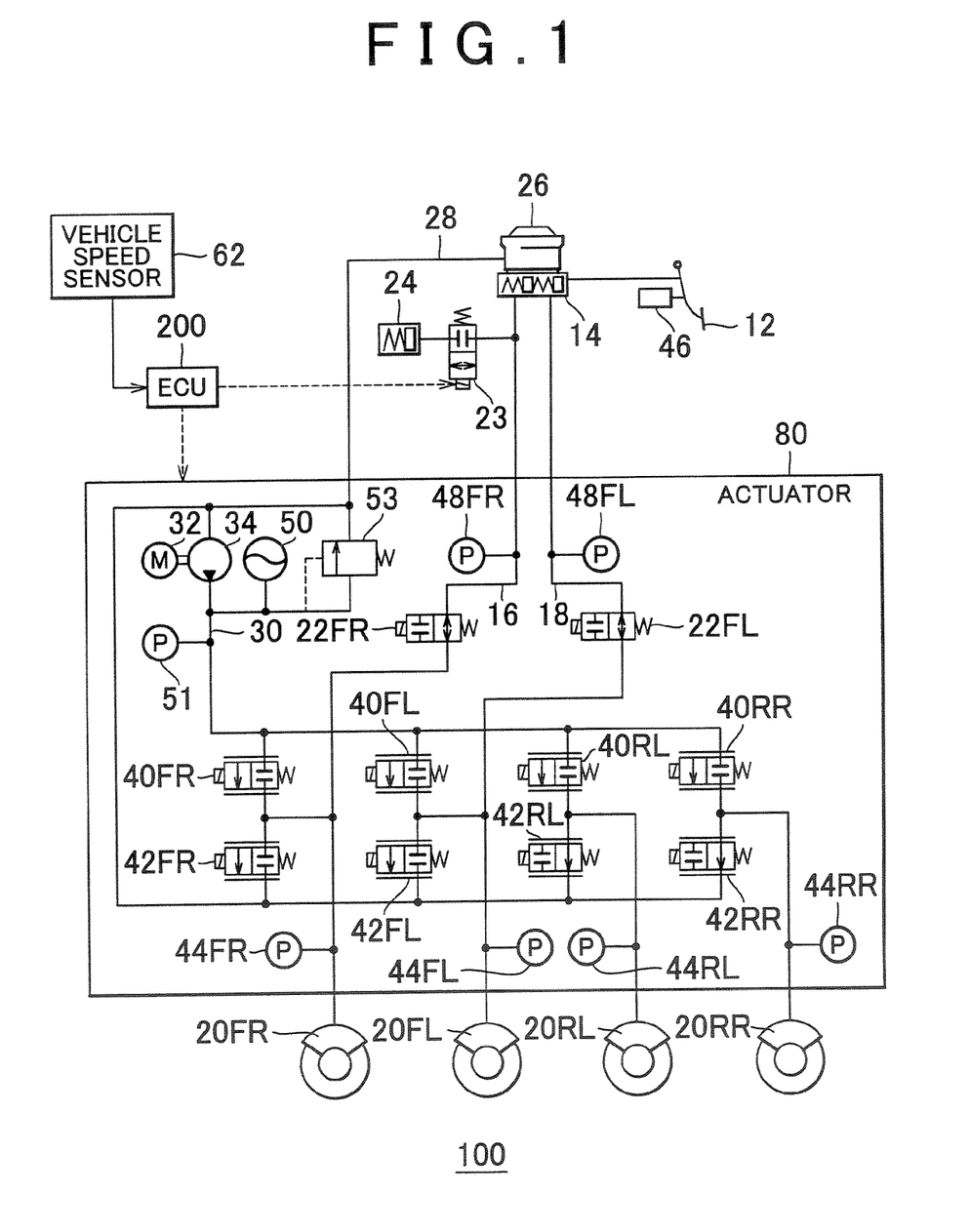
FIG. 1 is a block diagram of a vehicle brake system according to a first embodiment of the invention.

FIG. 1 is a block diagram showing a vehicle brake system 100 according to the first embodiment of the invention, and an electronic control unit (hereinafter referred to as an ECU) 200. The vehicle brake system 100 includes an actuator 80 and components other than the actuator 80, such as a master cylinder 14. The vehicle brake system 100 is formed as an electronically controlled brake (ECB) system in which a sensor detects the operation amount of the brake pedal and an appropriate brake hydraulic pressure is calculated such that brakes operate independently on four wheels.

The brake pedal 12 is provided with a stroke sensor 46, which detects a pedal stroke. The master cylinder 14 pumps brake oil as the working fluid in accordance with the pedal stroke of the brake pedal 12.

One end of each brake hydraulic control line 16 and 18, for front right and left wheels, respectively, is connected to the master cylinder 14. The other ends of the brake hydraulic control lines 16 and 18 are respectively connected to wheel cylinders 20FR and 20FL for the front right and front left wheels. The wheel cylinders 20FR and 20FL apply braking force to the front right and front left wheels, respectively. Right and left electromagnetic switching valves 22FR and 22FL are provided at intermediate positions between the master cylinder 14 and the wheel cylinders 20FR and 20FL along the brake hydraulic control lines 16 and 18, respectively. The right and left electromagnetic switching valves 22FR and 22FL are normally open when electricity is not applied (hereinafter referred to as the "normally open type"), and are closed when the braking operation is detected.

Right and left master pressure sensors 48FR and 48FL are provided at intermediate positions along the brake hydraulic control lines 16 and 18 for measuring the master cylinder hydraulic pressure for the front right and left wheels, respectively. When the driver operates the brake pedal 12, the stroke sensor 46 detects the pedal stroke. However, on the assumption that the stroke sensor 46 may fail, the operating force on the brake pedal 12 may also be detected by using the right and left master pressure sensors 48FR and 48FL to measure the master cylinder hydraulic pressure for the front right and left wheels, respectively. The master cylinder hydraulic pressure is thus monitored by two sensor systems 46 and 48, as a fail-safe measure.

A reservoir tank 26 is connected to the master cylinder 14, and a stroke simulator 24 for generating a reference pedal stroke and reaction force is connected to the brake hydraulic control line 16 via a switching valve 23. The switching valve 23 is a normally closed electromagnetic valve that opens in response to the braking operation. The reservoir tank 26 is connected to one end of a hydraulic pressure line 28. The hydraulic pressure line 28 is provided with an oil pump 34 driven by a motor 32. A discharge side of the oil pump 34 is connected to a high-pressure line 30, which is provided with an accumulator 50 and a relief valve 53. The oil pump 34 causes brake oil to accumulate in the accumulator 50 at high pressures in the range (hereinafter referred to as "control range") from 14 to 22 Mpa, for example. The relief valve 53 is opened to discharge the high-pressure brake oil to the hydraulic pressure line 28 when the accumulator pressure exceeds a threshold pressure, for example, 25 MPa.

The high-pressure line 30 is provided with an accumulator pressure sensor 51 that measures the accumulator pressure. The accumulator pressure is then output from the accumulator pressure sensor 51 to the ECU 200, to be described later. The motor 32 is controlled such that the accumulator pressure is maintained within a control range.

The high-pressure line 30 is connected to the front right, front left, rear right, and rear left wheel cylinders 20FR, 20FL, 20RR, and 20RL (hereinafter collectively referred to as "wheel cylinders 20") via pressure-increasing valves 40FR, 40FL, 40RR, and 40RL, which are electromagnetic flow control valves, that is, linear valves, that are normally closed when electricity is not applied ("normally closed type") and that increase the pressure in the respective wheel cylinders as necessary. The pressure-increasing valves 40FR, 40FL, 40RR, and 40RL will be collectively referred to as the pressure-increasing valves 40 hereinafter.

The right and left front wheels and the right and left rear wheels (none of which are shown) are each provided with disk brakes. Wheel cylinders 20FR, 20FL, 20RR, and 20RL are driven to press the respective brake pads against the respective disks for applying the braking force.

The hydraulic pressure line 28 is connected to the front right and left wheel cylinders 20FR and 20FL via pressure-reducing valves 42FR and 42FL, which are normally closed electromagnetic flow control valves, that is, linear valves, that reduce the pressure as necessary. The hydraulic pressure line 28 is also connected to the rear right and left wheel cylinders 20RR and 20RL via normally open pressure-reducing valves 42RR and 42RL. Hereinafter, the pressure-reducing valves 42RR, 42RL, 42FR and 42FL will be collectively referred to as the pressure-reducing valves 42.

Pressure sensors 44FR, 44FL, 44RR, and 44RL for the right and left front wheels and rear wheels for measuring the fluid pressure within the respective wheel cylinders are provided near the right and left front and rear wheel cylinders 20FR, 20FL, 20RR, and 20RL, respectively.

The ECU 200 controls the electromagnetic switching valves 22FR, 22FL, the switching valve 23, the motor 32, the four pressure-increasing valves 40FR, 40FL, 40RR, and 40RL, and the four pressure-reducing valves 42FR, 42FL, 42RR, and 42RL. The ECU 200 includes a computation unit formed of a microprocessor, a ROM that stores various control programs, and a RAM serving as a data storage unit or a work area for executing the program.

Although the details are not shown in the drawings, the computation unit receives pressure signals (hereinafter collectively referred to as "wheel cylinder hydraulic signals") from the pressure sensors 44FR, 44FL, 44RR, and 44RL for the front right, front left, rear right, and rear left wheels, respectively, indicating the respective pressures in the front right, front left, rear right, and rear left wheel cylinders 20FR, 20FL, 20RR, and 20RL. The computation unit further receives signals from the stroke sensor 46 (hereinafter referred to as the stroke signal) indicating the pedal stroke of the brake pedal 12, signals indicating master cylinder hydraulic pressures (hereinafter referred to as the master cylinder hydraulic pressure signals) from the right and left master pressure sensors 48FR and 48FL, and signals indicating an accumulator pressure (hereinafter referred to as the accumulator pressure signal) from the accumulator pressure sensor 51.

The ROM of the ECU 200 stores a predetermined braking control flow. The computation unit calculates a target deceleration for the vehicle based on the stroke signal and the master cylinder hydraulic pressure signals, as well as the target wheel cylinder hydraulic pressure for each wheel based on the calculated target deceleration. The pressure-increasing valves 40 and the pressure-reducing valves 42 are controlled such that the wheel cylinder hydraulic pressure of each wheel becomes the target wheel cylinder hydraulic pressure. The ECU 200 receives vehicle speed information from a vehicle speed sensor 62 that detects a revolution speed of a wheel to calculate the vehicle speed.

The oil pump 34 is driven by the motor 32 to pump brake oil from the reservoir tank 26 through the hydraulic pressure line 28 and accumulate in the high-pressure brake oil in the accumulator 50. The high hydraulic pressure in the accumulator 50 is supplied to the respective wheel cylinders 20 by controlling the opening and closing of the pressure-increasing valves 40 in accordance with the target wheel cylinder hydraulic pressures.

When high-pressure brake oil from the accumulator 50 is consumed in response to the operation of the brake pedal 12, the ECU 200 operates the motor 32 to drive the oil pump such that the pressure of the accumulator 50 is maintained within a control range. The high-pressure brake oil is thus accumulated in the accumulator 50. The above-described operation will be hereinafter referred to as an "accumulation operation". The accumulation operation is automatically performed in accordance with the detected value of the accumulator pressure sensor 51.

Figure 2:
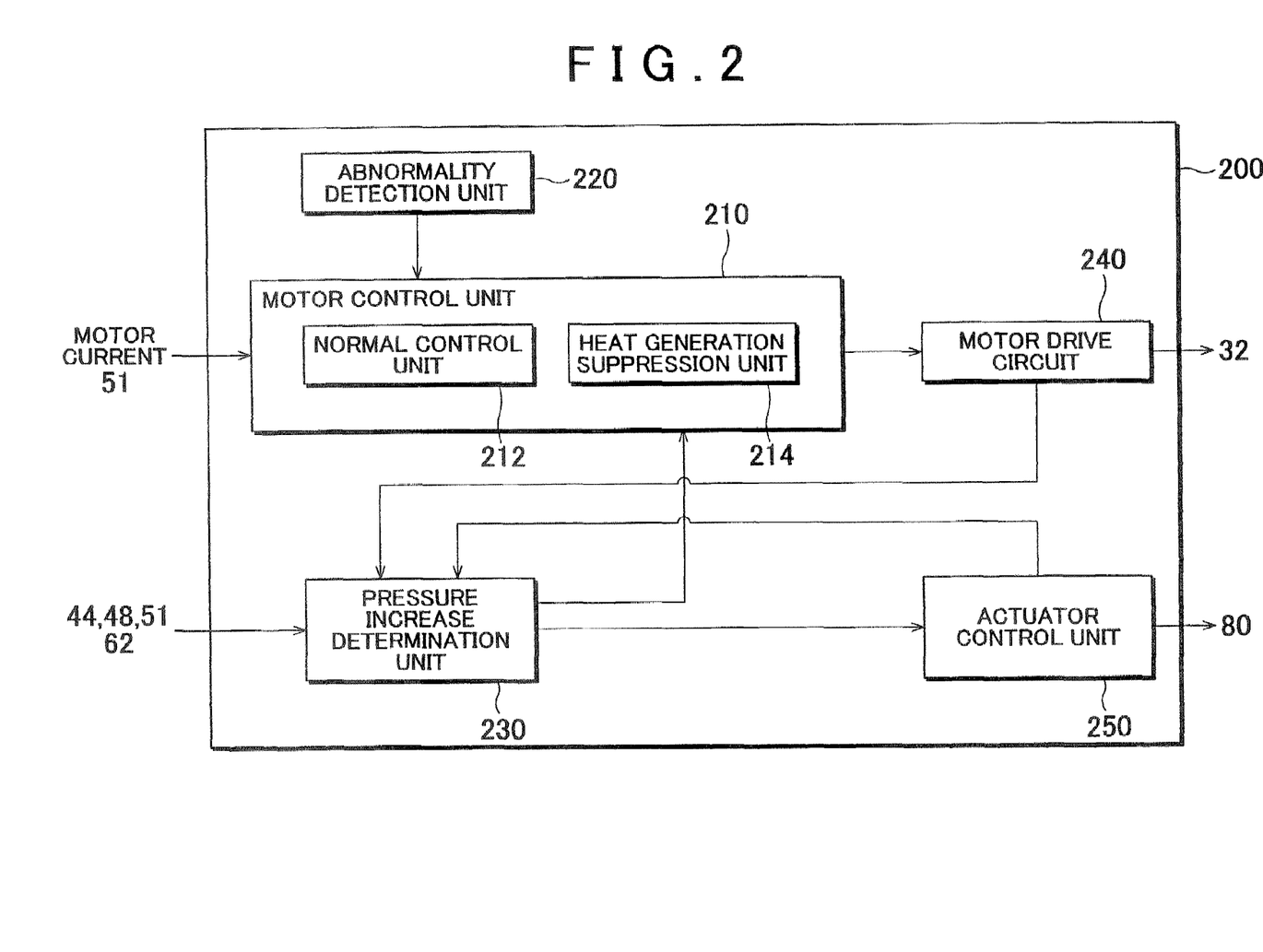
FIG. 2 is a functional block diagram showing a structure of an ECU unit relevant to suppression of heat generation.

FIG. 2 is a functional block diagram that represents a structure of a portion of the ECU 200 that is relevant to suppression of heat generation by the motor 32. Each block of the diagram is realized in terms of hardware by elements and mechanical devices such as a CPU and a memory of a computer. They are also realized in terms of software by computer programs and the like. The diagram shows functional blocks that are realized by collaboration among the aforementioned elements. Therefore, it is to be understood that the functional blocks can be realized in various forms, depending on combinations of hardware and software.

An abnormality detection unit 220 detects any abnormalities in the actuator 80, the ECU 200, and the like. The abnormality detection unit 220 determines that an abnormality is present when i) a failure occurs in the accumulator pressure sensor 51; ii) brake oil leaks from the hydraulic pressure line 28 or the high-pressure line 30; iii) brake oil leaks from the pressure-increasing valves 40 or the pressure-reducing valves 42; or iv) the ECU 200 cannot obtain the accumulator pressure due to disconnection of a signal line between the accumulator pressure sensor 51 and the ECU 200 or similar cause.

The accumulator pressure sensor can use its self-diagnostic function to detect abnormalities, such as a gain abnormality, a line disconnection, a freezing of the detection value, and the like. The self-diagnostic function can detect brake oil leakage by comparing the motor operating time and the pressure of the accumulator 50 when the brakes are not being operated. Specifically, the accumulator pressure when the motor 32 is operated while the brakes are not being operated is determined in advance by experimentation or the like. When the accumulator pressure fails to reach the experimentally determined value when the motor 32 is operated for a certain time, brake oil leakage from the hydraulic pressure line 28 or the high-pressure line 30 is judged to have occurred.

A motor control unit 210 controls the motor 32 that drives the oil pump 34 based on comparisons of the motor drive current and the accumulator pressure. The motor control unit 210 includes a normal control portion 212 and a heat generation suppression portion 214. The normal control portion 212 controls the motor 32 when no abnormality is present in the vehicle brake system 100. Specifically, the normal control portion 212 operates the motor 32 to drive the oil pump 34 such that the accumulator pressure does not fall below the lower limit value of the aforementioned control range and the high-pressure brake oil is accumulated in the accumulator 50. When the accumulator pressure reaches the upper limit value of the control range, the normal control portion 212 stops the motor 32.

The heat generation suppression portion 214 operates the motor intermittently when any abnormality in the vehicle brake system 100 is detected by the abnormality detection unit 220. If the accumulator pressure sensor fails, for example, the motor control cannot be performed to maintain the accumulator pressure within the control range. Therefore, when an abnormality occurs, the heat generation suppression portion 214 instructs a motor drive circuit 240 to operate the motor 32, which drives the oil pump 34, at a fixed revolution speed and at a prescribed duty ratio (for example, 40%). The duty ratio may be varied according to the extent of failure. The intermittent operation prevents the motor 32 from generating excessive heat as a result of operating continuously without increasing the accumulator pressure over time, because brake oil is leaking or the accumulator pressure is unknown.

Under the control of a related technology, when the driver operates the brake pedal 12, the motor operates whether it is in an operating phase or a stop phase of the intermittent operation cycle. This is done in order to apply the desired braking force even during intermittent operation, so as to prevent an excessive drop in the pressure that acts on the wheel cylinder, even if the accumulator pressure drops.

However, if the driver operates the brake pedal several times within a short period, the intermittent operation cycle is interrupted, and the motor operates, every time the driver operates the brake pedal. The end result is that the motor operation time is not reduced and the amount of heat generated by the motor increases. If the amount of heat generated increases, a motor with a correspondingly higher thermal rating must be mounted in the vehicle, increasing the motor weight and the manufacturing cost.

According to the first embodiment of the invention, a control is added that inhibits motor operation when prescribed conditions are met, even if the driver operates the brake pedal. The control will be described in detail with reference to FIGS. 4 and 5.

A pressure increase determination unit 230 determines whether there is a need to increase pressure in the accumulator 50. The need to increase pressure may be determined based on the vehicle speed, a master cylinder state quantity, a control current applied to the pressure-increasing valves 40, and the like. Specifically, when the vehicle is stopped, the pressure increase determination unit 230 determines that there is no need to increase pressure. In addition, pressure increase determination unit 230 may determine that the pressure needs to be increased when the state quantity of the master cylinder 14 equals or exceeds a prescribed threshold value. The pressure increase determination unit 230 may also determine that there is no need to increase pressure when the pressure-increasing valves are open, but the control current applied thereto has dropped to approximately the level when the valves are closed.

The heat generation suppression portion 214 operates the motor 32 when the pressure increase determination unit 230 determines that there is a need to increase pressure to the wheel cylinder, whether intermittent operation is in effect. When the pressure increase determination unit 230 determines that there is no need to increase pressure to the wheel cylinder, the motor 32 stops, whether intermittent operation is in effect.

The motor drive circuit 240 receives DC power supplied from a battery (not shown) mounted in the vehicle. The motor drive circuit 240 is provided with a semiconductor relay (not shown) for switching operation of the motor 32. Alternatively, a mechanical relay may be provided in place of the semiconductor relay, or two relays may be arranged in parallel such that one relay is used as a back-up for the other relay. The switching of the semiconductor relay is controlled by a pulse signal generated at a prescribed cycle. The revolution speed and the like of the motor 32 can be controlled according to the ON time duty ratio of the pulse signal that sets the semiconductor relay ON.

An actuator control unit 250 applies operating current to the pressure-increasing valves 40, the pressure-reducing valves 42, and the electromagnetic switching valves 22 that make up the actuator 80 to control the switching operation of each valve.

Figure 3:
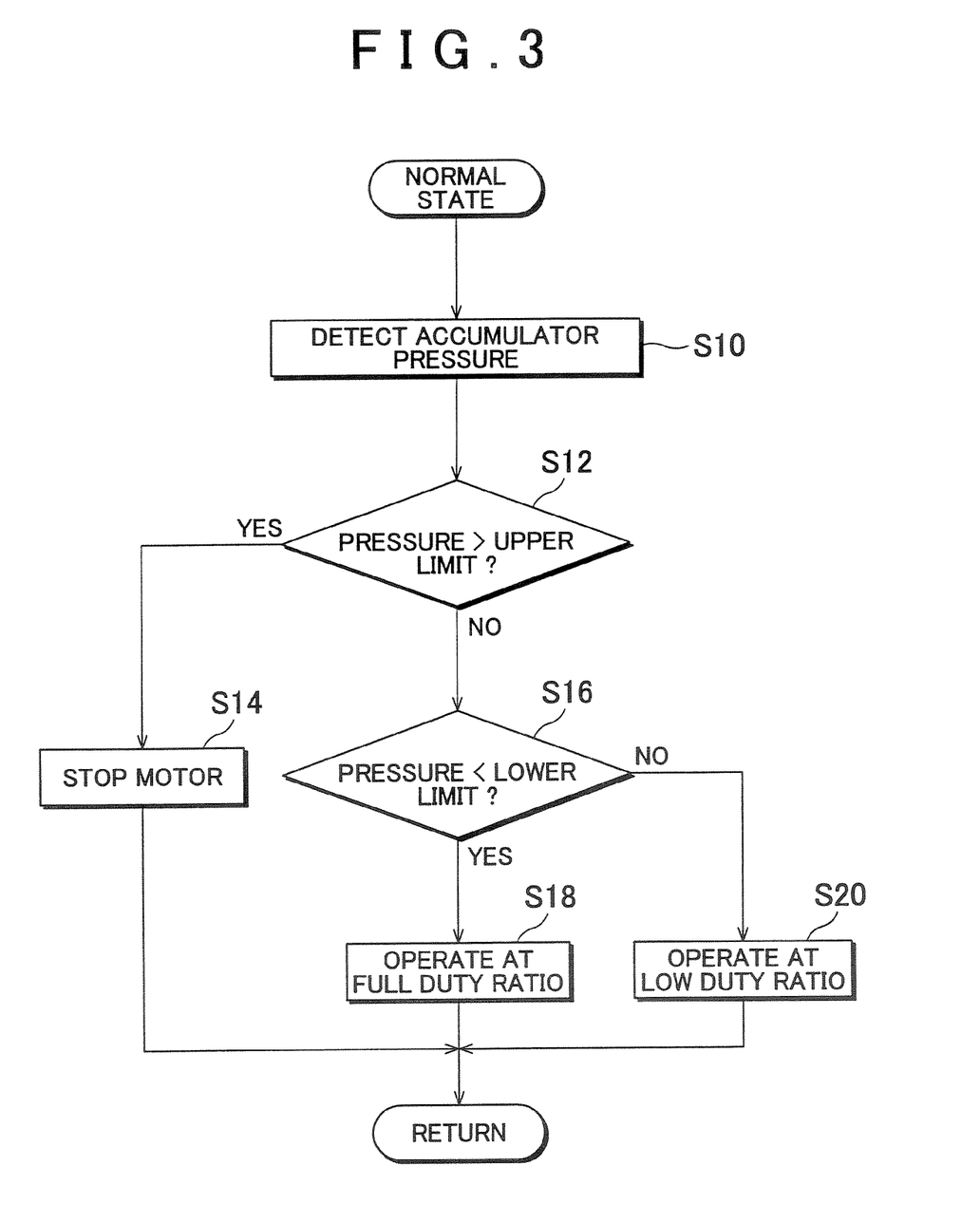
FIG. 3 is a flowchart showing a motor control routine during normal operation.

FIG. 3 is a flowchart showing a routine of a motor control when no abnormality is detected by the abnormality detection unit 220. First, in step S10, the accumulator pressure sensor 51 detects the accumulator pressure. Then in step S12, the normal control portion 212 determines whether the accumulator pressure exceeds the upper limit value of the predetermined control range. In this case, the upper limit value is set lower than the relief pressure value. If the accumulator pressure is higher than the upper limit value (Yes in step S12), the process proceeds to step S14, where the motor 32 is stopped if it was in operation. As the vehicle brake system 100 is provided with the relief valve 53 that opens when the accumulator pressure is equal to or higher than a prescribed pressure, no problem occurs even if the motor 32 continues to operate. However, the motor 32 is stopped to reduce its power consumption, heat generation, and operating noise.

If the accumulator pressure is equal to or lower than the upper limit value (No in step S12), the process proceeds to step S16, where the normal control portion 212 determines whether the accumulator pressure has dropped below the lower limit value of the predetermined control range. The lower limit value is set to a pressure slightly higher than the lowest pressure at which the accumulator 50 can continue to operate. For example, if the lowest pressure at which operation can continue is 12 MPa, the lower limit value may be set to 14 MPa. If the accumulator pressure is below the lower limit value (Yes in step S16), the pressure of the accumulator 50 must be increased immediately to avoid deterioration in braking performance, so in step S18, the motor 32 is operated at a duty ratio of 100%. If the accumulator pressure is equal to or higher than the lower limit value (No in step S16), there will be no problem with the braking performance even if the accumulator pressure is not rapidly increased. Therefore, in step S20, the motor 32 is operated at a low duty ratio, for example, 20%.

If an abnormality in the vehicle brake system 100 is not detected, the normal control portion 212 operates the motor 32 to drive the oil pump 34 to maintain the accumulator pressure within the appropriate range.

Figure 4:
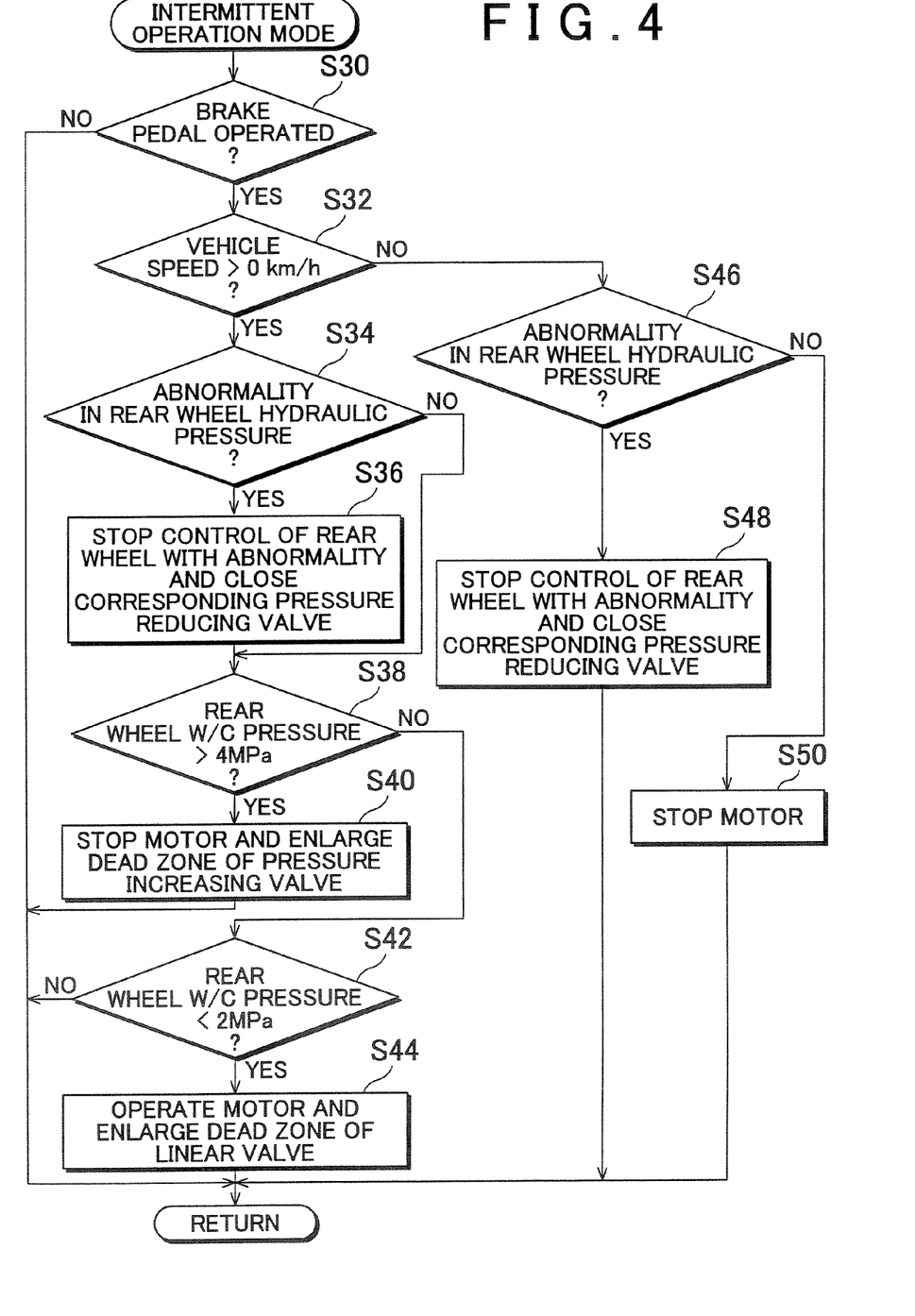
FIG. 4 is a flowchart showing a motor control routine during intermittent motor operation according to the first embodiment of the invention.

FIG. 4 is a flowchart of a control routine during intermittent operation of the motor. The routine is executed at a prescribed cycle while the vehicle is running. For example, when the brake pedal is operated during intermittent operation of the motor, the determination whether the motor should be operated or stopped is made based on whether there is a need to increase pressure.

First, in step S30, the pressure increase determination unit 230 determines whether the driver is operating the brake pedal. If it is determined that the driver is not operating the brake pedal (No in step S30), the heat generation suppression portion 214 operates or stops the motor in accordance with the intermittent operation cycle. If the driver is operating the brake pedal (Yes in step S30), the process proceeds to step S32, where the pressure increase determination unit 230 determines whether the vehicle speed is greater than 0 km/h, that is, whether the vehicle is moving. If the vehicle is moving (Yes in step S32), it is determined in step S34 whether the hydraulic pressure for the rear wheel (RR or RL) is abnormal. If an abnormal hydraulic pressure is detected (Yes in step S34), the motor control unit 210 stops controlling the rear wheel that is judged to have the abnormal pressure, and the actuator control unit 250 closes the corresponding pressure-reducing valve 42RR or 42RL in step S36. If an abnormal hydraulic pressure is not detected (No in step S34), step S36 is skipped.

In step S38, the pressure increase determination unit 230 determines whether the wheel cylinder pressure of the rear wheel (RR or RL) is higher than a prescribed pressure, for example, 4 MPa. If the wheel cylinder pressure is higher than the prescribed pressure (Yes in step S38), the process proceeds to step S40, because sufficient braking force can be generated. In step S40, the heat generation suppression portion 214 stops the motor 32 that drives the oil pump 34, if the motor is in operation. At this time, the actuator control unit 250 is allowed to enlarge the dead zone of the valve opening current of the applicable pressure-increasing valve 40RR or 40RL. Although this causes the wheel cylinder pressure to deviate further from the target value, it delays the decrease in the brake oil accumulated in the accumulator 50, so the motor operates less frequently. In this case, the threshold value used in step S34 for abnormal hydraulic pressure in the rear wheels may be changed so as to make a judgment of abnormal pressure less likely.

If the wheel cylinder pressure is equal to or lower than the prescribed pressure (No in step S38), the process proceeds to step S42, where the pressure increase determination unit 230 determines whether the wheel cylinder pressure of the rear wheel is below, for example, 2 MPa. If the wheel cylinder pressure is below 2 MPa (Yes in step S42), the process proceeds to step S44, because the braking force will be insufficient unless additional brake oil is supplied to the wheel cylinder. In step S44, the heat generation suppression portion 214 operates the motor 32 even if the intermittent operation cycle is in the stop phase. At this time, the actuator control unit 250 is allowed to enlarge the dead zone of the valve opening current of the applicable pressure-increasing valve 40RR or 40RL. If the wheel cylinder pressure is at least 2 MPa (No in step S42), but not greater than 4 MPa, the heat generation suppression portion 214 operates or stops the motor in accordance with the intermittent operation cycle.

If the vehicle is stopped (No in step S32), the process proceeds to step S46, where it is determined whether the hydraulic pressure for the rear wheel (RR or RL) is abnormal. If the hydraulic pressure is abnormal (Yes in step S46), the motor control unit 210 stops controlling the rear wheel that is judged to have the abnormal pressure. Then in step S48, the actuator control unit 250 closes the corresponding pressure-reducing valve 42RR or 42RL. If the hydraulic pressure is not abnormal (No in step S46), the process proceeds to step S50 as there is no need to generate braking force while the vehicle is stopped. In step S50, the heat generation suppression portion 214 stops the motor, if the motor is in operation.

If the brake pedal 12 is continuously operated when a brake oil leak is present in the hydraulic lines or the pressure-increasing or pressure-reducing valves, the hydraulic pressure accumulated in the accumulator 50 gradually decreases. If, while the accumulator pressure is decreased, the brake pedal 12 is operated at a pressure equal to or higher than the accumulator pre-charge pressure (for example, 9.4 MPa), the pressure generated in the master cylinder 14 moves toward the accumulator. As a result, the brakes do not operate effectively, and the master cylinder 14 bottoms out. Therefore to avoid bottoming of the master cylinder 14 the accumulator pressure must be maintained at or above a prescribed pressure when set conditions are met.

Figure 5:
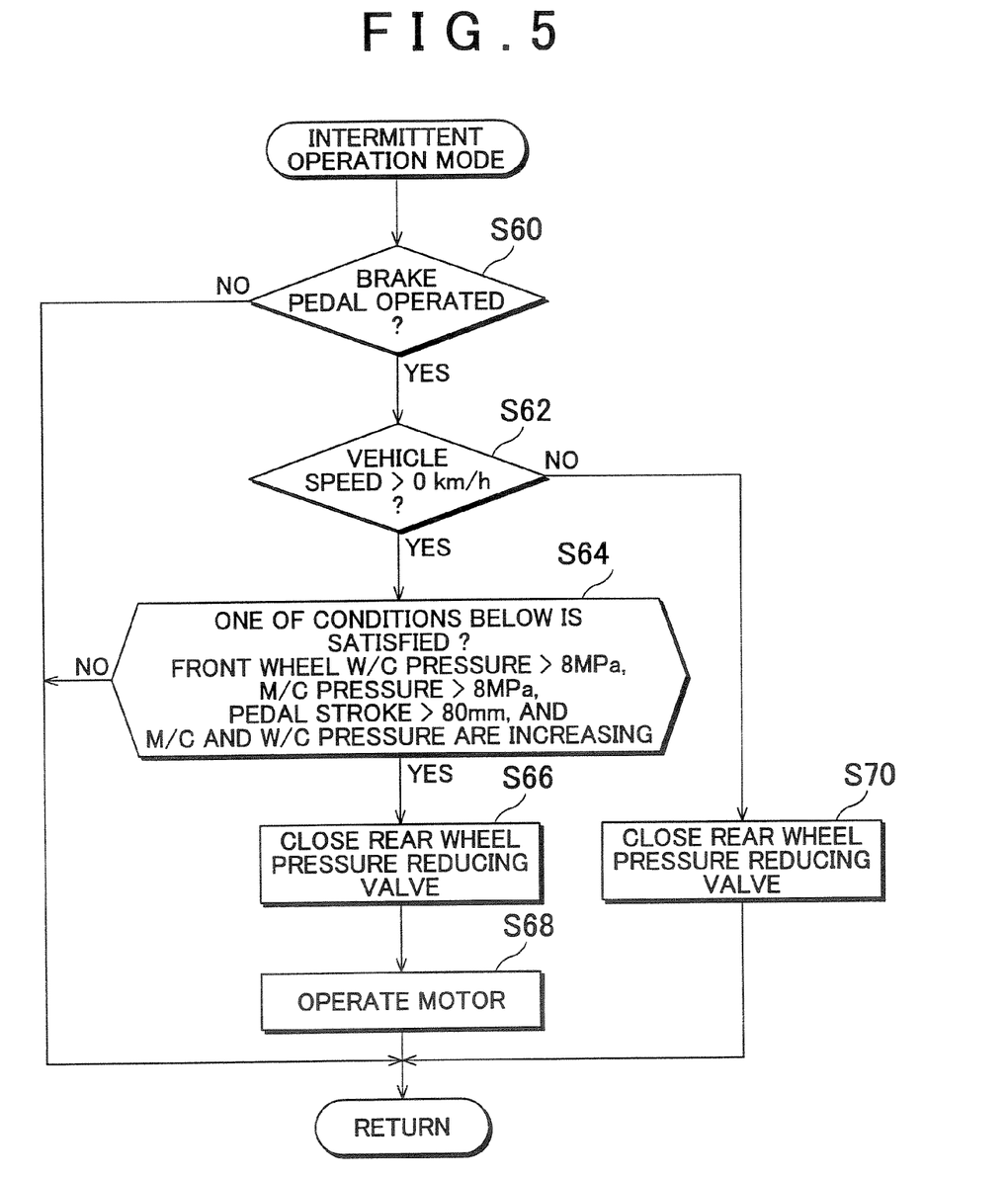
FIG. 5 is a flowchart showing a control routine for avoiding bottoming of the master cylinder.

FIG. 5 is a flowchart showing a control routine that is executed to avoid bottoming of the master cylinder. First, in step S60, the pressure increase determination unit 230 determines whether the driver has operated the brake pedal 12. If the brake pedal 12 has not been operated (No in step S60), the heat generation suppression portion 214 operates and stops the motor in accordance with the intermittent operation cycle. If the brake pedal has been operated (Yes in step S60), the process proceeds to step S62, where the pressure increase determination unit 230 determines whether the vehicle speed is higher than 0 km/h, that is, if the vehicle is moving. If the vehicle is stopped (No in step S62), the process proceeds to step S70, where the motor is stopped to close the pressure-reducing valves 42RR and 42RL for the rear wheels.

If the vehicle is moving (Yes in step S62) and the brake pedal 12 is operated at a pressure equal to or higher than the pre-charge pressure of the accumulator 50 when a brake oil leak is present in the pressure-increasing valves for the rear wheels (RR, RL) or front wheels (FR, FL), bottoming of the master cylinder 14 is likely to occur, as described above. In this situation, the pressure increase determination unit 230 determines whether any one of the following conditions is satisfied in step S64:

1. The wheel cylinder (W/C) pressure for the front wheel (FR, FL) is higher than a prescribed pressure (for example, 8 MPa).
2. The master cylinder (M/C) pressure for the front wheel is higher than a prescribed pressure (for example, 8 MPa).
3. The brake pedal stroke is greater than a prescribed value (for example, 80 mm).
4. Both the master cylinder pressure and the wheel cylinder pressure are increasing.

If any one of the conditions 1 to 4 is satisfied (Yes in step S64), there may be a need to increase pressure to the accumulator. The actuator control unit 250, therefore, closes the pressure-reducing valve 42RR or 42RL for the rear wheel in step S66. Then in step S68, the heat generation suppression portion 214 operates the motor 32 even if it is in the stop phase of the intermittent operation cycle. This increases the accumulator pressure to avoid bottoming of the master cylinder 14. Because the pressure-reducing valve 42RR or 42RL is closed, the brake oil supplied to the wheel cylinder is not returned to the reservoir tank 26.

If none of the above conditions is satisfied (No in step S64), the heat generation suppression unit 214 operates and stops the motor in accordance with the intermittent operation cycle.

The routine shown in the flowchart of FIG. 5 may be executed independently or may be combined with that shown in the flowchart of FIG. 4.

According to the embodiment, when there is no need to increase pressure to the accumulator while the motor that drives the pump for the accumulator is in intermittent operation due to an abnormality in the vehicle brake system, the motor is stopped irrespective of the intermittent operation cycle. This makes it possible not to operate the motor unless there is a need to increase pressure, even if the driver operates the brake pedal. Unnecessary heat generation by the motor can thus be suppressed.

If the motor load becomes higher than necessary, thereby increasing the amount of heat generated by the motor, the motor must be designed to dissipate the excess heat, which means that a larger motor must be used. According to the first embodiment of the invention, the motor is stopped when the vehicle is in a stopped state, even if the driver operates the brake pedal. This makes it possible to use a motor with a lower thermal rating than that required for the uniform intermittent operation used by the related technology. A smaller and lighter motor may therefore be used.

As has been described with respect to the first embodiment of the invention, it is to be understood that the embodiment described herein is only an example, and the invention may be modified by combining various elements and processes, which modifications are also are within the scope of the invention.

When the vehicle is stopped, the actuator control unit 250 may, in synchronization with the operating phase of the motor intermittent operation cycle, apply a current slightly lower than the valve opening current to the pressure-increasing valve 40RR or 40RL for the rear wheel (RR or RL), so as to reduce the pressure at which the pressure-increasing valve opens. This causes the pressure-increasing valve 40RR or 40RL to open at a pressure lower than the relief pressure for the relief valve 53, thereby lowering the accumulator relief pressure, which in turn decreases the load on the motor 32 that drives the oil pump 34. Heat generation by the motor can thus be suppressed. This is equivalent to using the pressure-increasing valve 40RR or 40RL as a relief valve instead of the accumulator relief valve 53. Note that when the vehicle is moving, it is acceptable not to apply current to the pressure-increasing valve, because opening the valve causes brake oil to flow to the wheel cylinder 20, creating a risk that the brake will drag.

After braking, when the current value for the pressure-increasing valve for either the RR or RL rear wheel returns to approximately the level when the valves are closed, that is, when the valve is in a state immediately prior to closing, there is no longer any need to increase pressure to the accumulator, so the heat generation suppression portion 214 may stop the motor 32. The motor can therefore stop at an earlier stage, further suppressing the amount of heat generated.

If the vehicle is stopped, when the brake pedal 12 is not being operated, or when the shift lever is in the Park position, or immediately after the ignition has been turned OFF, the actuator control unit 250 may open the pressure-increasing valves 40 completely to force brake oil through the valves, so as to flush out any foreign matter that is stuck in the pressure-increasing valves or elsewhere and to refresh the valves.

What is claimed is:

1. A vehicle brake system comprising:
   a pump driven by a motor;
   an accumulator, in which a working fluid discharged from the pump is accumulated under pressure;
   a wheel cylinder to which the working fluid from the accumulator is supplied and that generates braking force on a wheel that is mounted on the vehicle;
   an abnormality detection unit that detects an abnormality in the vehicle brake system;
   a pressure increase determination unit that determines whether there is a need to increase pressure to the wheel cylinder; and
   a heat generation suppression unit that operates the motor intermittently when an abnormality is detected, operates the motor when there is a need to increase pressure to the accumulator even if the motor is stopped during operation of the motor intermittently, and inhibits the motor operation when there is no need to increase pressure to the accumulator even if the brake operation is initiated during operation of the motor intermittently, so as to suppress heat generation by the motor when the abnormality is detected.

2. The vehicle brake system according to claim 1, wherein the pressure increase determination unit determines that there is no need to increase pressure to the wheel cylinder if the vehicle is stopped.

3. The vehicle brake system according to claim 1, further comprising:
   a master cylinder that supplies the working fluid at a pressure in accordance with an operation amount of a brake pedal, wherein
   the pressure increase determination unit determines that there is a need to increase pressure to the wheel cylinder if a state quantity of the master cylinder is equal to or larger than a predetermined threshold value.

4. The vehicle brake system according to claim 1, further comprising:
   a fluid passage that connects the accumulator with the wheel cylinder; and
   a pressure-increasing valve that is disposed in the fluid passage, and controls supply of the working fluid to the wheel cylinder, wherein
   the pressure increase determination unit determines that there is no need to increase pressure to the wheel cylinder when the pressure-increasing valve is open and a control current applied thereto is reduced to approximately a level at a time which the pressure-increasing valve is closed.

5. The vehicle brake system according to claim 1, wherein the heat generation suppression unit operates the motor such that a pressure of the working fluid accumulated in the accumulator is maintained within a prescribed control range.

6. A vehicle control method comprising:
   detecting an abnormality in a vehicle brake system provided with a wheel cylinder that generates braking force on a wheel, mounted on a vehicle, when a working fluid is supplied to the wheel cylinder from an accumulator in which the working fluid, discharged from a pump driven by a motor, is accumulated under pressure;
   operating the motor intermittently when an abnormality is detected in the vehicle brake system;
   determining if a vehicle brake is operated during the intermittent operation; and
   operating the motor when there is a need to increase pressure to the accumulator even if the motor is stopped during operation of the motor intermittently and inhibiting the motor operation when there is no need to increase pressure to the accumulator even if the brake operation is initiated during operation of the motor intermittently when the abnormality is detected, so as to suppress heat generation by the motor.

* * * * *